(12) United States Patent
Evans (10) Patent No.: US 10,031,221 B2
(45) Date of Patent: Jul. 24, 2018

(54) SYSTEM AND METHOD FOR ESTIMATING NUMBER AND RANGE OF A PLURALITY OF MOVING TARGETS

(71) Applicant: RAYTHEON COMPANY, Waltham, MA (US)

(72) Inventor: Bruce William Evans, Marina Del Rey, CA (US)

(73) Assignee: RAYTHEON COMPANY, Wahtham, MA (US)

( * ) Notice: Subject to any disclaimer, the term of this patent is extended or adjusted under 35 U.S.C. 154(b) by 327 days.

(21) Appl. No.: 15/060,350

(22) Filed: Mar. 3, 2016

(65) Prior Publication Data

US 2017/0254893 A1   Sep. 7, 2017

(51) Int. Cl.
*G01S 13/58* (2006.01)
*G01S 13/72* (2006.01)
*G01S 13/00* (2006.01)

(52) U.S. Cl.
CPC .......... *G01S 13/582* (2013.01); *G01S 13/723* (2013.01); *G01S 13/726* (2013.01)

(58) Field of Classification Search
CPC .. G01S 13/582; G01S 13/5244; G01S 13/723; G01S 13/726
See application file for complete search history.

(56) References Cited

U.S. PATENT DOCUMENTS

| | | | | |
|---|---|---|---|---|
| 5,451,960 | A * | 9/1995 | Kastella et al. | ...... G01S 13/726 |
| 5,617,099 | A * | 4/1997 | Warren et al. | ...... G01S 13/5244 |
| 7,180,443 | B1 * | 2/2007 | Mookerjee et al. | .. G01S 13/723 |
| 7,248,206 | B1 * | 7/2007 | Boka et al. | ........... G01S 13/726 |
| 7,298,315 | B2 | 11/2007 | Gerlach et al. | |
| 7,439,906 | B1 | 10/2008 | Blunt et al. | |

(Continued)

OTHER PUBLICATIONS

Blunt, Shannon et al.; "Doppler Compensation & Single Pulse Imaging via Adaptive Pulse compression"; IEEE Trans. Aerospace & Electronic Systems; vol. 45; No. 2, pp. 647-659; Apr. 2009.

(Continued)

*Primary Examiner* — Bernarr E Gregory
(74) *Attorney, Agent, or Firm* — Lewis Roca Rothgerber Christie LLP (57) ABSTRACT

System and method for estimating locations and range rates of a multiplicity of targets by estimating range-Doppler state representation, including: computing a prior range-Doppler state estimate matrix and a measurement matrix containing phase shifted and re-ordered samples of a transmitted signal waveform; applying the measurement matrix to the range-Doppler state estimate matrix to generate a prediction of a current return sample and calculating a difference between the current return signal sample and the prediction of the current return signal sample; multiplying the difference by a gain matrix to obtain an adjustment to the prior range-Doppler state estimate matrix; repeating the process for a next return signal; computing an estimated range-Doppler map (RDM); applying a threshold to the estimated RDM to detect individual targets and obtain their range and Doppler parameters; and using the range and Doppler parameters to estimate the locations and range rates of the targets.

14 Claims, 8 Drawing Sheets
(1 of 8 Drawing Sheet(s) Filed in Color)

(56) References Cited

U.S. PATENT DOCUMENTS

| | | | |
|---|---|---|---|
| 7,474,257 | B2 | 1/2009 | Blunt et al. |
| 7,535,412 | B1 | 5/2009 | Blunt et al. |
| 7,605,747 | B1 * | 10/2009 | Mookerjee et al. .. G01S 13/723 |
| 7,626,534 | B1 * | 12/2009 | Boka et al. ........... G01S 13/726 |
| 2008/0074310 | A1 | 3/2008 | Blunt et al. |
| 2009/0212994 | A1 * | 8/2009 | Hamza et al. ........ G01S 13/723 |
| 2012/0030154 | A1 * | 2/2012 | Nicholson et al. ... G01S 13/726 |

OTHER PUBLICATIONS

Blunt, Shannon et al.; "A Novel Pulse Compression Scheme Based on Minimum Mean-Square Error Reiteration"; IEEE International Conference on Radar; Adelaide, Australia; Sep. 3-5, 2003; pp. 349-353.

Blunt, Shannon et al.; "Adaptive Pulse Compression"; IEEE Radar Conference; Philadelphia, PA; Apr. 26-29, 2004; pp. 271-276.

Blunt, Shanon et al.; "Adaptive Pulse Compression via MMSE Estimation"; IEEE Trans. Aerospace & Electronic Systems; vol. 42; No. 2; pp. 572-584; Apr. 2006.

* cited by examiner

SYSTEM AND METHOD FOR ESTIMATING NUMBER AND RANGE OF A PLURALITY OF MOVING TARGETS

FIELD OF THE INVENTION

The disclosed invention relates generally to radars; and more particularly to a system and method for estimating number, range and range rate of a plurality of moving targets.

BACKGROUND

A typical radar system includes a powerful transmitter and sensitive receiver normally connected to the same antenna. After producing a brief pulse of radio signal, the transmitter is turned off for the receiver to receive the reflections of pulse signal off distant targets. Thus, the radar receives a return signal that is a superposition of reflections from each target, each reflection being a time delayed and scaled version of the transmitted pulse. In a simple realization, the transmitted pulse is simply a constant amplitude and frequency sinusoid that is rapidly switched on and off. This is commonly referred to as a CW (continuous wave) pulse. However, this waveform has significant limitations. If the range difference between two targets is small enough that the difference in their reflection delays is less than the pulse duration, their reflections will overlap and the radar will not be able to resolve them as separate targets. Thus, it is desirable to make the pulse duration as short as possible. However, the maximum range at which a target is detectable depends on the energy transmitted in the pulse, which is proportional to the product of the pulse amplitude and pulse duration. Thus if pulse duration is decreased, pulse amplitude must be increased to maintain detection range, but there are practical limitations to how much amplitude (and corresponding transmit power) can be increased.

An alternative approach is to transmit a relatively long pulse, but to modulate it in some way. This allows closely separated targets to be resolved even though their reflections overlap by means of appropriate signal processing. Such techniques are generically referred to as pulse compression, since in effect they compress a long duration modulated pulse to provide resolution comparable to a much shorter CW pulse. A commonly used pulse compression technique employs a matched filter (MF) technique, in which, a replica of the transmitted pulse is correlated with the return signal over the range of potential target delays. This processing produces a signal consisting of delayed and scaled versions of the transmitted pulse autocorrelation function (where the delays correspond to the round-trip propagation time for each target and the scaling depends on the reflection strength for each target), plus random background noise. Thus, by choosing a transmit waveform having an autocorrelation function, that is a narrow pulse, the matched filter output produces signal spikes corresponding to target ranges.

Figure 1A:
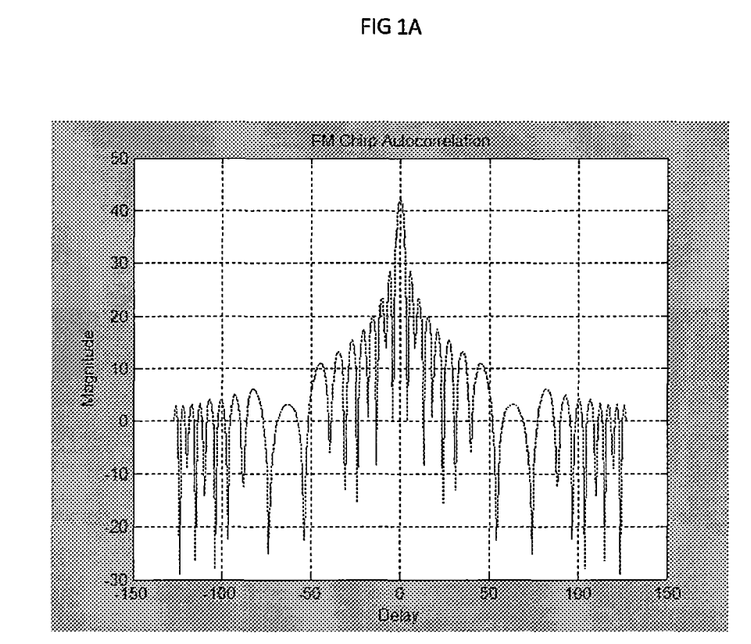
FIG. 1A is a graph for a typical FM chirp autocorrelation function.

An ideal transmit waveform would have an impulse autocorrelation function (i.e., with a finite value at zero delay, and zero elsewhere). However, such a waveform is not physically realizable and practical waveforms only approximate this ideal to various degrees. A commonly used example is the FM chirp, in which, frequency is linearly swept over time. This produces an autocorrelation function such as illustrated in FIG. 1A, which has a strong peak (or main lobe) surrounded by smaller peaks (side lobes) whose amplitudes rapidly decay away from the main lobe.

Figure 1B:
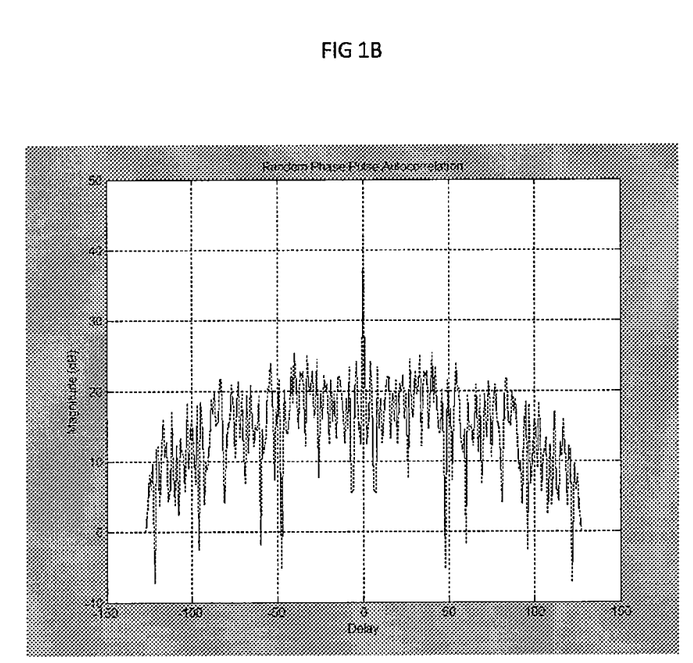
FIG. 1B is a graph for a typical pseudo-random noise modulation autocorrelation function.

Another alternative is to use a pseudo-random noise (PRN) pulse, in which, a pseudo-random noise process is used to vary the amplitude and phase of a sinusoidal carrier wave. FIG. 1B shows an example autocorrelation function for such a random phase waveform. Like the FM chirp, this autocorrelation technique has a strong main lobe peak, but the side lobes remain more uniformly high and away from the main lobe. This means that weaker targets may be buried in the side lobes of stronger targets, even if range (delay) separation between them is large. Despite this, using PRN may still be desirable, for instance, to make detection of the radar signal by hostile observers more difficult.

Another factor to consider is that targets and/or the radar may be in motion, so that target range may be changing at a non-zero rate. This results in a Doppler shift, i.e., a difference between the frequencies of the transmitted signal and the received target reflection. Absent compensation, this Doppler shift may degrade MF performance, since the Doppler effectively adds frequency modulation that de-correlates the return signal. Thus, some means of estimating and compensating Doppler frequency is desirable. In addition, Doppler estimates provide useful information in their own right, since they indicate the rate at which target range is opening or closing. Consequently, the problem of jointly estimating range and Doppler for a multiplicity of targets is of key importance in many radar systems.

There have been many approaches to estimate range-Doppler of a radar. For example, Doppler compensated matched filters are commonly used. However, the effectiveness of this approach depends the transmit waveform auto-correlation properties, for example, the uniformly high range side-lobes associated with PRN waveforms limit the ability to detect weak targets in the presence of strong targets. Various minimum mean square error (MMSE) algorithms have been proposed to mitigate these range side-lobes. These algorithms postulates a mathematical model, that is, a function that maps certain unknown input variables (such as target delay, Doppler and amplitude) to a model output that predicts the actual observed data. Because of random measurement errors the actual observations generally do not exactly match the model outputs, even if the inputs are correct.

Given an observation, MMSE algorithms attempt to determine the unknown model inputs by finding values the make the mean square error (MSE) between the model output and the observation as small as possible. These include techniques such as adaptive pulse compression (APC) algorithms that are able to accurately estimate the range profile of a radar by suppressing range side-lobes to a minimum level by using reiterative minimum mean-square error (RMMSE) technique described, for example, in U.S. Pat. No. 6,940,450, the entire content of which is incorporated herein by reference. However, this approach does not address Doppler estimation at all.

A more recently developed single pulse imaging (SPI) method explicitly considers both Doppler and range estimation. However, this method is limited by the assumption that the number of transmit pulse samples is substantially less than the number of range bins. The SPI method also requires a series of matrix inversion operations with dimension equal to the transmit pulse sample length, which are computational intensive and complex.

Accordingly, there is a need for a more efficient, more flexible, less computationally complex and higher quality approach to estimate range-Doppler of a radar.

SUMMARY

The embodiments of the disclosed invention utilize a sequential sample-by-sample process that substantially reduce computation complexity, reduce masking of weaker targets by strong signals (targets), and allow arbitrarily long duration transmit pulses.

In some embodiments, the disclosed invention is a method for estimating locations and range rates of a multiplicity of targets by estimating range-Doppler state representation. The method includes:
  a. transmitting an arbitrary signal waveform by a transmitter;
  b. receiving a plurality of return signal samples reflected from the targets, by a receiver;
  c. computing and initializing a prior range-Doppler state estimate matrix, wherein the range-Doppler state estimate matrix is a two-dimensional matrix with a first index corresponding to a range and a second index corresponding to Doppler frequency of each potentially detected target;
  d. computing a measurement matrix containing phase shifted and re-ordered samples of the transmitted signal waveform; wherein computing the measurement matrix depends only on the transmitted signal and is independent of the return signal samples.
  e. applying the measurement matrix to the prior range-Doppler state estimate matrix to generate a prediction of a current return sample, and calculating a difference between the current return signal sample and the prediction of the current return signal sample;
  f. multiplying the difference by a gain matrix to obtain an adjustment to the prior state estimate matrix, wherein the gain matrix includes values that are re-calculated for each return signal sample;
  g. adding the adjustment to the prior range-Doppler state estimate matrix to obtain an updated range-Doppler state estimate matrix;
  h. repeating steps d to g for a next return signal sample using the updated state estimate matrix as the prior state estimate matrix for said next return signal sample, for a predetermined number of times to generate a final state estimate matrix;
  i. taking magnitudes of the elements of the final state estimate matrix to compute an estimated range-Doppler map (RDM);
  l. applying a threshold to the estimated RDM to detect individual targets and obtain their range and Doppler parameters; and
  m. using the range and Doppler parameters to estimate the locations and range rates of the targets.

In some embodiments, the disclosed invention is a radar system for estimating locations and range rates of a multiplicity of targets by estimating range-Doppler state representation comprising:
  a transmitter for transmitting an arbitrary signal waveform;
  a receiver for receiving a plurality of return signal samples reflected from the targets; and
  a processor including a memory for
  a. computing and initializing a prior range-Doppler state estimate matrix, wherein the range-Doppler state estimate matrix is a two-dimensional matrix with a first index corresponding to a range and a second index corresponding to Doppler frequency of each potentially detected target;
  b. computing a measurement matrix containing phase shifted and re-ordered samples of the transmitted signal waveform; wherein computing the measurement matrix depends only on the transmitted signal and is independent of the return signal samples.
  c. applying the measurement matrix to the prior range-Doppler state estimate matrix to generate a prediction of a current return sample, and calculating a difference between the current return signal sample and the prediction of the current return signal sample;
  d. multiplying the difference by a gain matrix to obtain an adjustment to the prior state estimate matrix, wherein the gain matrix includes values that are re-calculated for each return signal sample;
  e. adding the adjustment to the prior range-Doppler state estimate matrix to obtain an updated range-Doppler state estimate matrix;
  f. repeating processes b to e for a next return signal sample using the updated state estimate matrix as the prior state estimate matrix for said next return signal sample, for a predetermined number of times to generate a final state estimate matrix;
  g. taking magnitudes of the elements of the final state estimate matrix to compute an estimated range-Doppler map (RDM);
  l. applying a threshold to the estimated RDM to detect individual targets and obtain their range and Doppler parameters; and
  m. using the range and Doppler parameters to estimate locations and range rates of the targets.

In some embodiments, the presence of a target is indicated by values in RDM elements corresponding to the range and Doppler of the targets that are larger than a predetermined threshold. In some embodiments, the estimated locations and range rates of the targets is utilized for one or more of navigating around or to the targets, monitoring speed of the targets, tracking one or more of the targets, forecasting the weather, locking a radar to one or more of the targets, directing a camera or a weapon towards one or more of the targets, and recognizing one or more of the targets

BRIEF DESCRIPTION OF THE DRAWINGS

The file of this patent contains at least one drawing executed in color photography. Copies of this patent with color photographs will be provided by the Patent and Trademark Office upon request and payment of necessary fee. These and other features, aspects, and advantages of the disclosed invention will become better understood with regard to the following description, appended claims, and accompanying drawings.

DETAILED DESCRIPTION

In some embodiments, the disclosed invention uses a sequential process that efficiently performs both range and Doppler estimation without any matrix inversion operations. This greatly increases the throughput.

In some embodiments, the disclosed invention is a system and method for digitally processing radar return signals by estimating a two-dimensional (2-D) array of range-Doppler reflection coefficients. The invention then progressively updates this estimate based on individual return samples. Optionally, the invention re-estimates signal statistics and re-computes the estimate to improve it. In some embodiments, the disclosed invention estimates range and Doppler for an unknown number of point scatterer targets, based on returns from a continuous noise-like transmitted RF waveform, where transmitted pulse waveform may not controlled by radar and the number of transmit pulse samples are much greater than the number of range bins.

In some embodiments, the approach of the disclosed invention is based on MMSE estimation techniques, in contrast to matched filtering. Consequently, unlike the matched filter, the performance of these embodiments is not affected by range side lobes of the autocorrelation function. In particular, the methods of the disclosed invention do not suffer from weak target masking due to high side lobes associated with noise-like waveforms.

In some embodiments, the disclosed invention provides side-lobe mitigation and allows for arbitrarily long transmit pulses. The disclosed invention performs an update of every range-Doppler bin for each return sample. The complexity of this updating depends only on number of range-Doppler bins and is independent of transmit pulse length.

In some embodiments, the disclosed invention observes a radar return signal over a period of time to determine how many targets are present, the time delay (or equivalently the range) of each target, the Doppler shift of each target, and/or the attenuation factor (or equivalently amplitude) of each target. The range and Doppler values of all targets are each assumed to lie within some finite, predetermined interval, so that all possible range and Doppler combinations lie within some rectangle in the range-Doppler coordinate plane. Each target can be represented by assigning its amplitude to the point in this rectangle corresponding to its range and Doppler (other points are assigned a value of zero). This representation is referred to as an ideal range-Doppler map (RDM).

In some embodiments, the disclosed invention obtains a discrete approximation of an ideal RDM by partitioning the RDM into discrete bins (cells or pixels) corresponding to uniformly spaced samples in the range and Doppler dimensions, with all targets within a bin lumped together. This discrete RDM can thus be considered as a two dimensional array (or matrix) of numbers with each element's value representing the target amplitude at each bin. This information is commonly presented to human viewers (e.g., on a display screen) in the form of an image, with pixel brightness or color corresponding to the amplitude of each range-Doppler bins. The observed return signal is typically obtained in the form of a series of complex-valued, discrete time samples. Consequently, target return amplitudes typically are also complex valued. Although for visualization purposes, only the (real) magnitudes are displayed, the actual complex (magnitude and phase) values are utilized by the disclosed invention. The complex-valued version of the discrete RDM is herein referred to as a range-Doppler "state", and the term RDM is herein reserved to refer to the magnitude only version.

The disclosed invention improves and benefits several different technology fields such as astronomy technology, various radar technologies, medical imaging and blood flow measurements, flow measurements, velocity profile measurements, satellite communication technologies, meteorological technologies (e.g. wind speed measurements and vibration measurement that use range and/or Doppler effects). The various radar technologies include non-cooperative transmitter (NCT) radars, low observable (LO) radars, and sonars. The disclosed invention also applies to Doppler beam sharpening, which dramatically improves angular resolution of some radars.

Figure 1C:
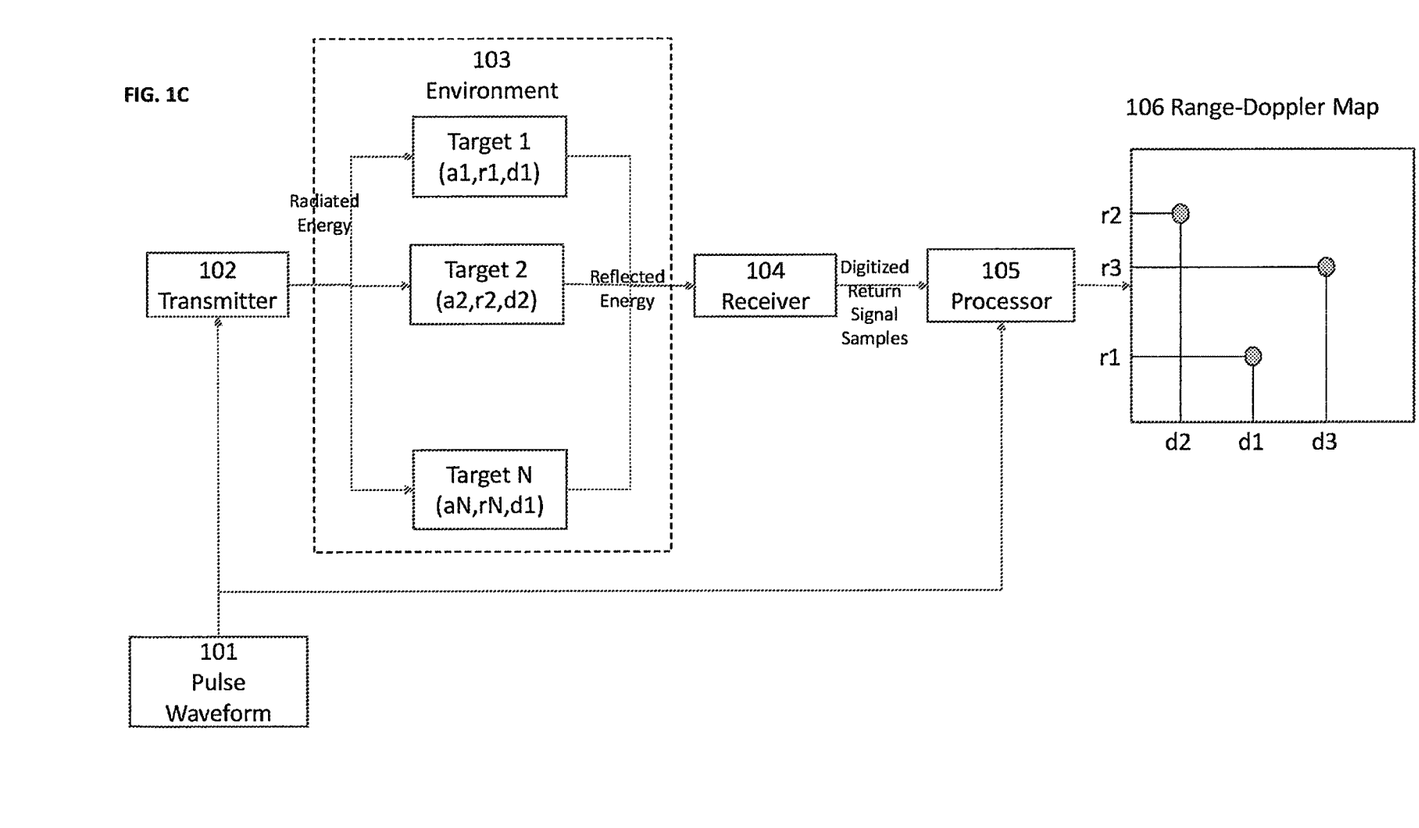
FIG. 1C is a simplified block diagram of a typical radar system

FIG. 1C is a simplified block of a typical radar system. As shown, a pulse waveform 101 is input to a transmitter 102. The transmitter 102 applies the pulse waveform to modulate a carrier wave, which is amplified and then radiated into the environment 103 by an antenna (not shown). The environment 103 contains a multiplicity of targets 1 to N, each of which reflects a version of the transmitted signal to a receiver 104. The reflection from the kth target is scaled by an amplitude $a_k$, delayed by a range-dependent time interval $r_k$ and modulated by a Doppler shift $d_k$ dependent on the relative motion of the target. The reflected energy (signal) seen by the receiver 104 is the superposition of all of these targets reflections.

The receiver amplifies the return signal, removes the carrier modulation, and digitizes the resulting baseband signal to provide a series of digitized sample values to a processor 105. The processor combines this sample data with digitized samples of the transmitted waveform to produce a range-Doppler map (RDM) 106 as its output. This RDM may be displayed to the user or more typically may be input to additional radar functional modules to detect and track individual targets. For example, a constant false alarm rate (CFAR) process may be used to set a target detection threshold applied to the RDM. Bins (cells), the values of which exceed this threshold, would be deemed to correspond to target detections, and the indices of these bins would map to range and Doppler of the targets, and their magnitudes would indicate target radar cross section. Detection and tracking of individual targets may be used in a variety of different applications, for example, for military or security purposes, for navigation of vehicles, aircrafts and ships, weather forecasting, monitoring the speed of vehicle, and the like.

Figure 2:
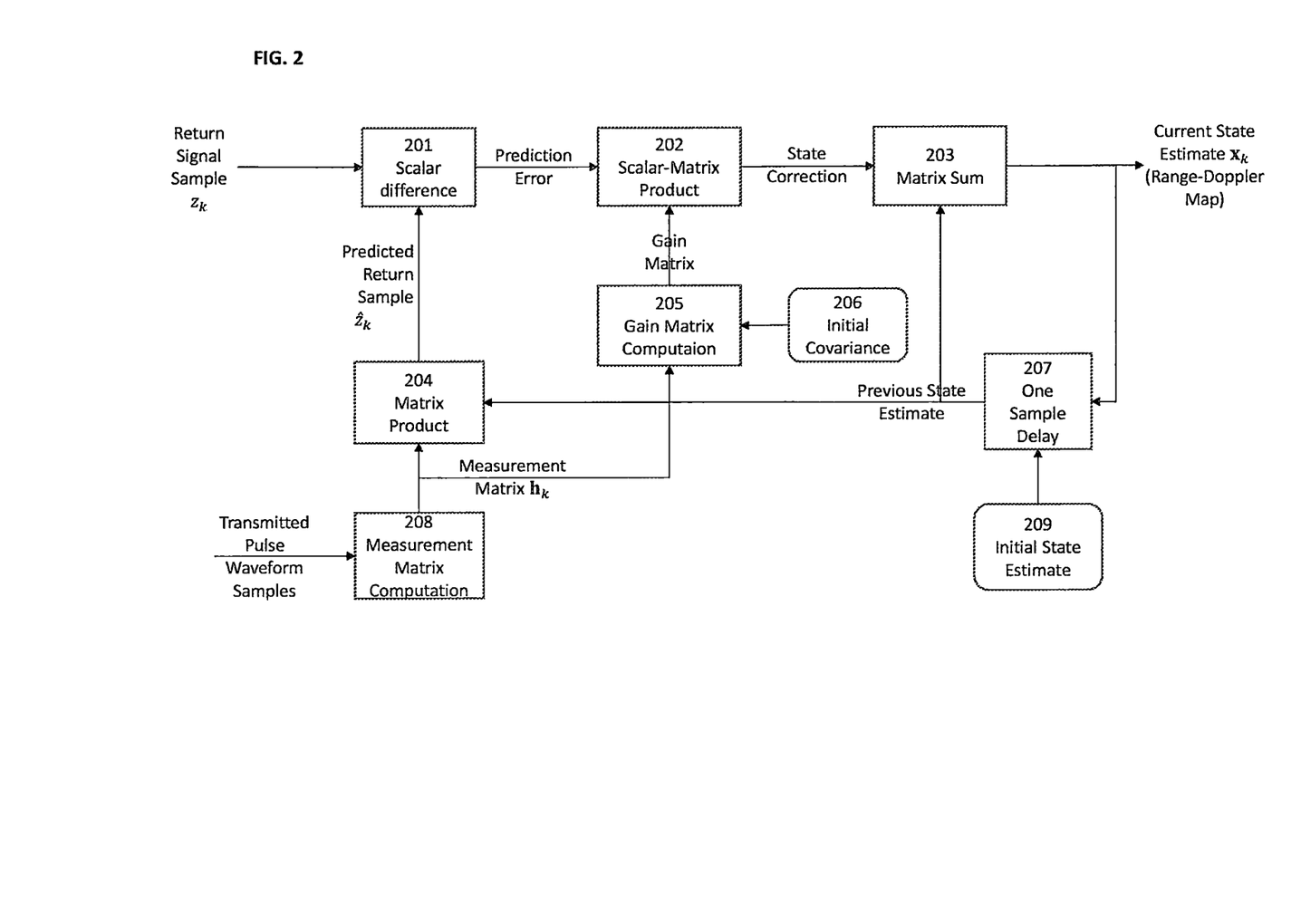
FIG. 2 is an exemplary block diagram of a target detection and range-Doppler estimation system, according to some embodiments of the disclosed invention.

FIG. 2 is an exemplary block diagram of a target detection and range-Doppler estimation system, according to some embodiments of the disclosed invention. This sequential minimum mean squared error (SMMSE) radar target detection system estimates a range-Doppler state representation of a multiplicity of moving targets. As shown, a sequence of return signal samples (for example, produced by a receiver) is input to a scalar difference computation module 201, which subtracts the predicted sample value from a matrix product 204 (described below) to produce a prediction error sample. The prediction error sample is then input to a scalar-matrix product module 202. A certain gain matrix produced by a gain matrix computation module 205 is multiplied by the prediction error used by module 202, producing a state correction matrix, which is then input to a matrix sum operation module 203.

The matrix sum operation module 203 adds the state correction matrix to the previous state estimate matrix to produce the state estimate matrix $X_k$ corresponding to the current sample $z_k$. The previous state estimate matrix is obtained from a one-sample delay module or memory 207. The current state estimate matrix $X_k$ is also fed to a one-sample delay module or memory 207 in preparation for processing the next sample. Typically, a sufficiently large number of return samples (the $Z_k$s) need to be processed to obtain a good state estimate (from which the output RDM is computed). Although sometimes one may wish to examine a smaller number of return samples for diagnostic purposes. The number of samples required depends on a number of factors, some of which may be specific to a particular application. Generally, the more samples the more accurate results, however, practical (system) considerations may limit this number.

Prior to processing the first sample, the contents of the one-sample delay memory 207 are initialized, for example, to zeros by an initial state estimate matrix module 209. The previous state estimate matrix is operated on by the matrix product module 204 to produce the predicted return sample $\hat{z}_k$. The predicted return sample is subtracted from the current return sample $z_k$ by the scalar difference computation module 201. A measurement matrix computation module 208 computes a measurement matrix $h_k$, which is then fed to the predicted sample computation in block 204 and the gain matrix computation module 205. The measurement matrix computation depends on transmitted pulse waveform samples. Accordingly, the gain matrix computation module 205 depends on the current measurement matrix, as well as a certain state error covariance matrix (stored by the gain matrix computation module 205), which is initialized by an initial covariance module 206 prior to processing the first return data sample, as explained below.

The various modules for the depicted SMMSE radar target detection system of FIG. 2 may be implemented using electronic circuits, such as application specific integrated circuits (ASICs), various types of gate arrays, EEPROMs, firmware or software executed by one or more processors, or a combination thereof.

The process performed by the depicted SMMSE radar target detection system of FIG. 2 is then repeated for each return signal sample $z_k$. In some embodiments, a predetermined number of times for repeating this process is a system parameter determined by required accuracy and computational resources, considering the type and range of the radar, the environment in which the targets are going to be detected, and type of the targets. The quality of the output RDM improves with increasing the number of samples, therefore, it is desirable to process as many samples as possible, given the time and system constraints. Additionally, the return signal may be sampled over a sufficiently long duration to ensure that echoes from the farthest expected target are received and processed.

Although the present disclosure is described for processing one return radar sample at a time for simplicity reasons, one skilled in the art would recognize that the disclosed invention works as well for processing multiple radar return samples at a time and thus is not limited to processing one return radar sample at a time.

Figure 3:
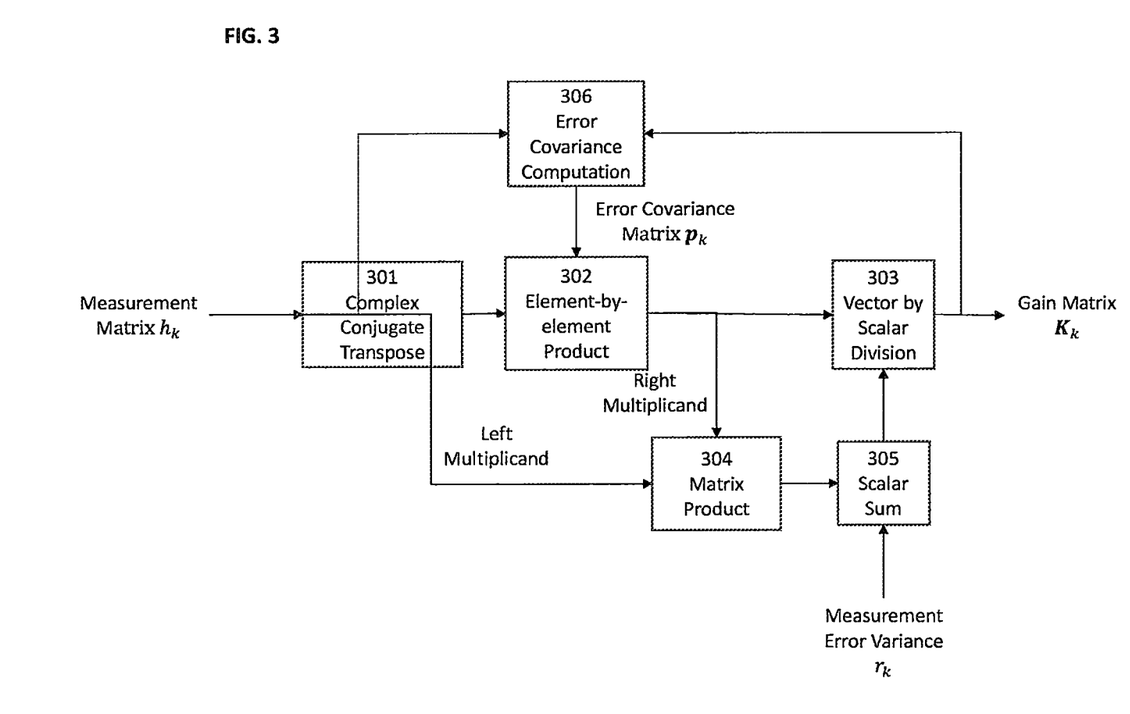
FIG. 3 is a simplified process flow for computing a gain matrix, according to some embodiments of the disclosed invention.

FIG. 3 is a simplified process flow for computing a gain matrix, according to some embodiments of the disclosed invention. As shown, the input to this process is the current measurement matrix $h_k$, for example, computed in block 208 of FIG. 2. In some embodiments, the matrix $h_k$ is a row matrix, with the number of its columns equal to the total number of elements in the state estimate matrix $X_k$. In general, the elements of this matrix are complex values. A Hermitian (complex conjugate) transpose of this matrix is computed in block 301. In block 302, an element-by-element product of the current measurement matrix and the current state error covariance vector $p_k$, which by definition has dimensions compatible with the output of block 301, is computed.

The output of block 302 is input to block 304 to form the right hand term in the matrix product computed in block 304. The left hand term of the matrix product computed in block 304 is the measurement matrix $h_k$. Note that because the product computed in block 304 is the product of a row matrix times a column matrix, the result is a 1 by 1 matrix, i.e., a scalar value. In block 305, the current measurement error variance $r_k$ is added to this scalar to form the divisor to be applied. This sum computed in block 305 then divides the output of block 302 in block 303 to produce the current gain matrix $k_k$ to be used to compute the current state estimate matrix $X_k$, for example, by the SMMSE radar target detection system of the disclosed invention.

Figure 4:
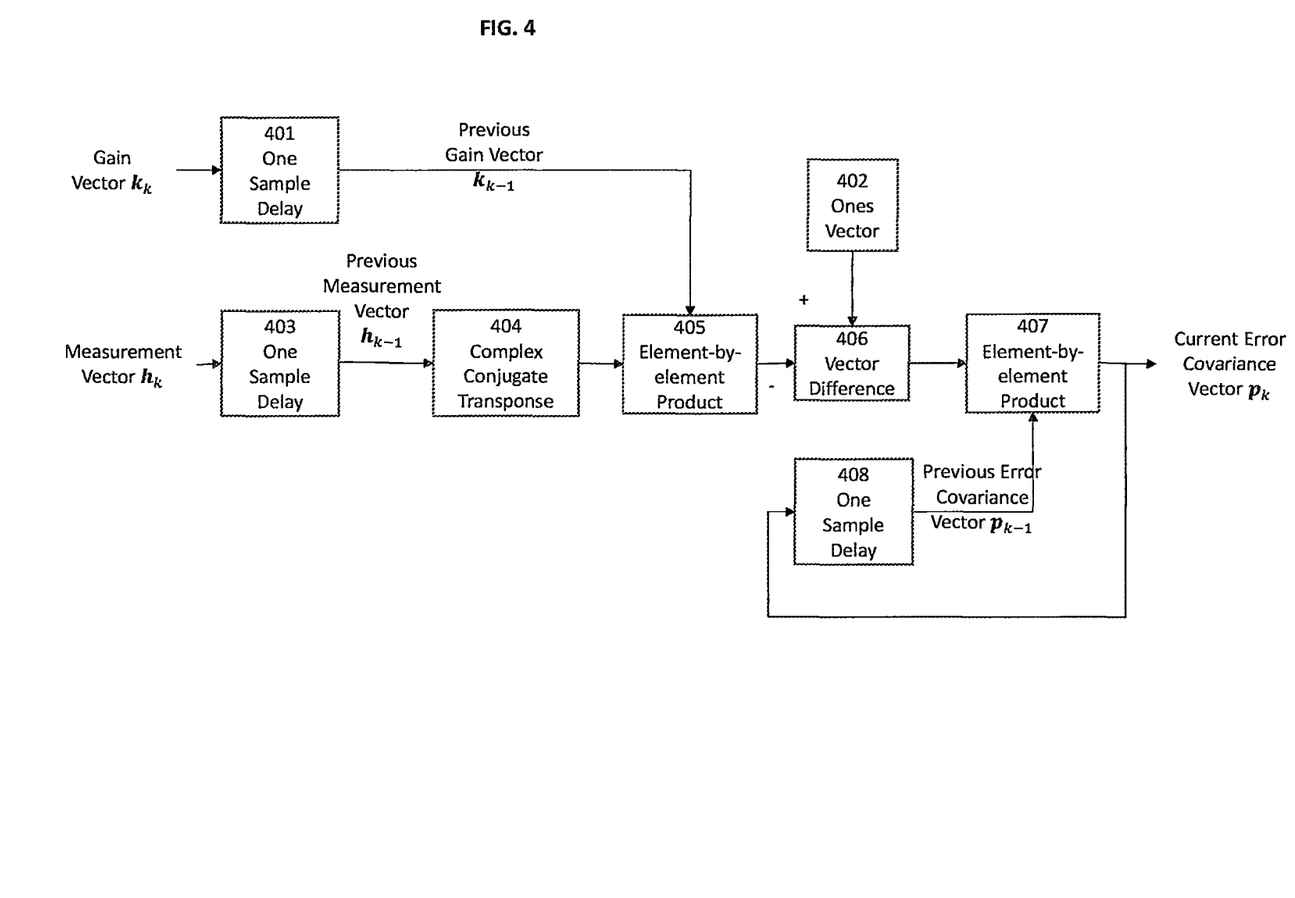
FIG. 4 is a simplified process flow for computing an error covariance vector, according to some embodiments of the disclosed invention.

FIG. 4 is a simplified process flow for computing an error covariance vector, according to some embodiments of the disclosed invention. The previous sample gain matrix $k_{k-1}$ and previous sample measurement matrix $h_{k-1}$ are retained in blocks 401 and 403, respectively, for example by a delay circuit or a processor delay loop. In block 404, the Hermitian transpose of the previous measurement matrix is computed and in block 405, each element of this Hermitian transpose is multiplied by the corresponding element of the previous gain matrix $k_{k-1}$. In block 406, each element of the vector output by block 405 is subtracted from one. The resulting vector is multiplied element-by-element with the previous error covariance vector in block 406, to produce the current error covariance vector.

The gain matrix computation takes input of an initial error covariance matrix, because the gain matrix computation (for example, in block 205 of FIG. 2) requires the current error covariance computation (for example, in block 306 of FIG. 3). The details of this computation shown in FIG. 4 imply that an initial value error covariance matrix value (which we designate as $p_o$) is stored in the one sample delay block 408 prior to processing this first return sample. In other words, the initial error covariance matrix is simply the initial contents of the delay block 408. One expedient way is to simply assign the measurement noise variance constant to each element of $p_o$. In some embodiments, a reiterative process may be used to refine the initial error covariance. This involves applying the SMMSE process to the complete return data sequence to obtain a final state estimate matrix $X_{N_o}$, where $N_o$ is the number of return samples. A new $P_o$ is computed as the square magnitudes of the elements of $x_{N_o}$:

$$p_o = x_{N_o} \circ x^*_{N_o} \qquad (3)$$

where * denotes complex conjugate and ° denotes Hadamard product, and $x_{N_o}$ is a vector obtained by concatenating the columns of $X_{N_o}$. Re-processing the return data sequence using this new initial covariance estimate suppresses the background noise and emphasizes the real targets. This process may be repeated multiple times as desired or required by certain applications.

The measurement matrix computation, for example, referenced in box 208 of FIG. 2 is now described. For purposes of this description, we assume a particular organization of the RDM, however, it will be apparent that other equivalent organizations are also possible and within the scope of the disclosed invention. In some embodiments, the input of this computation is a finite sequence of temporal samples of the transmitted pulse waveform, sampled at the same rate as the return signal (e.g., the input to block 201 of FIG. 2). The kth sample value in this sequence is denoted as $s_k$, where k ranges from 0 to $N_p-1$. For convenience, we adopt the convention that $s_k=0$ for k<0 and k≥$N_p$. For certain purposes, such as conveniently organizing and/or describing computations, or visual display, the state estimate matrix may be considered to be a matrix with $N_R$ rows and $N_D$ columns, where $N_R$ is the number of range bins and $N_D$ is the number of Doppler bins which we denote as $X_k$. Note that $X_k$ contains a total of $N_S=N_RN_D$ elements. This same data is also represented as a $N_S$ by 1 column vector $x_k$ which is the concatenation of the columns of $X_k$. The matrix product in block 204 can thus be expressed as $\hat{z}_k=h_kx_k$ where $\hat{z}_k$ is the predicted return sample (input to block 201) and $h_k$ is the 1 by $N_S$ measurement matrix. It is convenient to represent $h_k$ as the concatenation of $N_D$ row vectors (with dimension 1 by $N_R$) denoted by $g_{d,k}$. That is:

$$h_k=[g_{1,k}g_{2,k}\ldots g_{N_D,k}] \quad (1)$$

with $$g_{d,k}=\exp(ik\omega_d)[s_{k-1}\ s_{k-2}\ldots s_{k-N_R}] \quad (2)$$

where i is the imaginary unit and $\omega_d$ is the (radian) Doppler frequency corresponding to the dth Doppler bin.

In some embodiments, the disclosed invention processes the return sample sample-by-sample, in contrast to the batch processing of the conventional approaches. The "filter" state of the disclosed invention is a complex valued range-Doppler map, where a time varying measurement matrix $h_k$ models the transmitted pulse return samples. The estimated RDM $X_k$ is then updated using a gain matrix $K_k$ for each return sample $z_k$ according to the following:

$$X_{k+1}=X_k+K_k(Z_k-h_kX_k) \quad (4)$$

The sequential estimate process in (4) is similar to the well-known Kalman filter approach, which follows a similar pattern of estimating a state by predicting a related output based on the state, then correcting the state estimate matrix by a gain applied to the error between the predicted and measured output, and repeating this process for a series of samples. The Kalman filter is designed to estimate unmeasured states of a process, usually for the purpose of controlling one or more of them. See, for example, "William Douglas Schindel, Linear Estimation: The Kalman-Bucy Filter, Rose-Hulman Institute of Technology—Thesis, 1972," the entire content of which is hereby incorporated by reference.

The process adapts to data by re-estimating the initial state estimate matrix error covariance matrix and iterating the "filter" process. The computational complexity of the process is O((# of range bins)(# of Doppler bins)) per update, which is significantly lower than the conventional approaches.

Figure 5A:
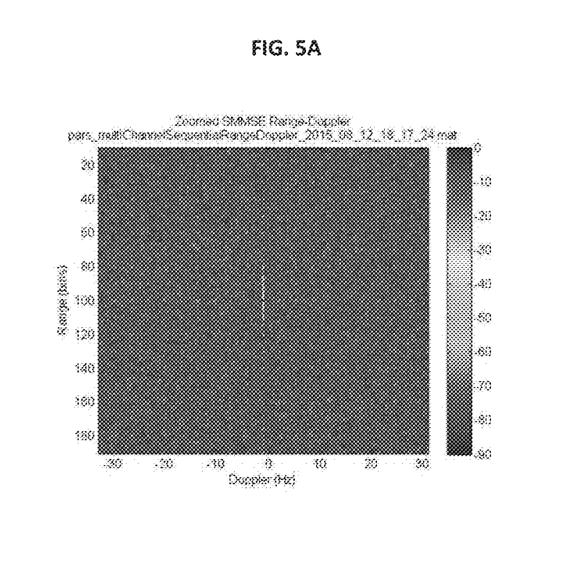
FIGS. 5A & 5B illustrate experimental graphs for a range-Doppler map comparison, according to some embodiments of the disclosed invention.
Figure 5B:
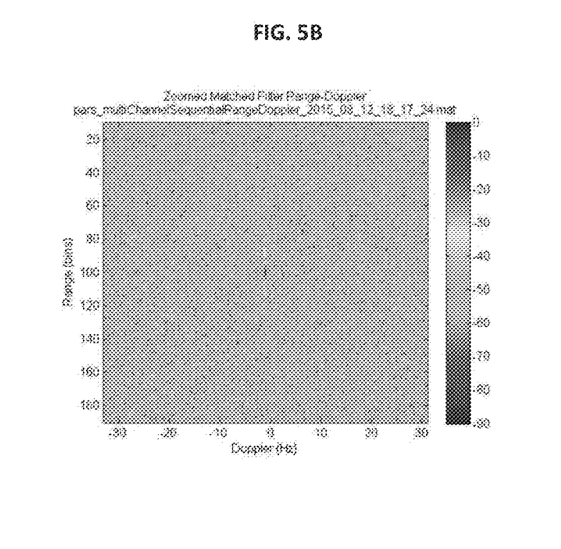

FIGS. 5A and 5B illustrate experimental range-Doppler maps (RDMs), according to some embodiments of the disclosed invention. FIG. 5A shows results for the disclosed invention and FIG. 5B shows comparable results for a conventional matched filter. In both cases, the same (simulated) radar return data was processed. This data contained a strong target (47 dB signal-to-noise ratio) with range and Doppler corresponding to the center of the RDM, surrounded by much weaker targets (−3 db SNR) arranged in a regular grid pattern in range and Doppler. The figures represent the RDM amplitudes as the color of each image pixels, with the color bar on the right indicating the correspondence between amplitude and color. The color bar scale is in dB relative to the maximum amplitude in each RDM. In FIG. 5A the strong central target is indicated by the dark red pixel in the image center, and the weak targets are readily discernable as light blue pixels against the dark blue background. In contrast, in the conventional matched filter results in FIG. 5B the strong target is still evident but the weak targets are invisible against the higher background levels which are a result of the uniformly high side lobes that are inherent in matched filter processing of PRN waveforms.

Figure 6:
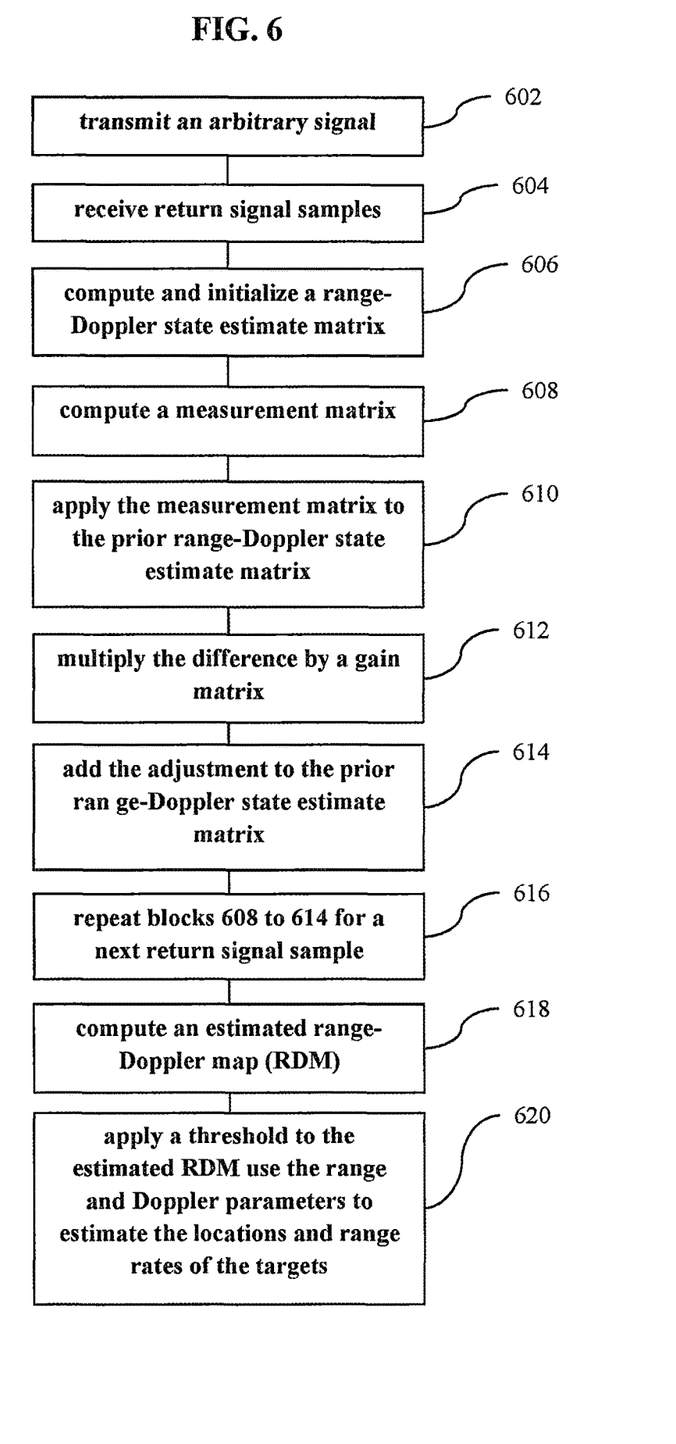
FIG. 6 is a simplified process flow for estimating a range-Doppler state representation of a multiplicity of moving targets, according to some embodiments of the disclosed invention.

FIG. 6 is a simplified process flow for estimating locations and range rates of a multiplicity of targets by estimating range-Doppler state representation, according to some embodiments of the disclosed invention. This information allows target locations to be estimated and tracked. As shown in block 602, an arbitrary signal waveform is transmitted towards a plurality of (suspected) targets, by a transmitter. In contrast to many conventional rage estimation and Doppler estimation method, the disclosed invention is not limited to specific transmit waveforms, rather, it is capable of processing an arbitrary signal waveform. In block 604, a plurality of return signal samples reflected from the moving targets are received by a receiver. A (prior) range-Doppler state estimate matrix is computed and initialized to zero at the beginning of the process, in block 606. For descriptive purposes, the range-Doppler state estimate matrix is considered to be a two-dimensional matrix with the row index corresponding to range and the column index to Doppler frequency. However, as one skilled in the art would readily understand, the embodiments of the disclosed invention are not limited to this configuration. For example, the range and Doppler index order of the range-Doppler state estimate matrix may be interchanged without affecting the disclosed invention.

In block 608, a measurement matrix containing phase shifted and re-ordered samples of the transmitted signal waveform is computed. This computation of the measurement matrix depends only on the transmitted signal and is independent of the return signal samples.

In block 610 a predicted of current return sample $\hat{z}_k$ is computed, for example, as the matrix product of $\hat{z}_k=h_kx_k$, where $h_k$ is the measurement matrix described previously and $x_k$ is the column vector form of the state estimate matrix, also described previously. A difference between the current return signal sample and the prediction of the current return sample is then computed also in block 610. In some embodiments, this difference may be a mere subtraction of the prediction of the current return sample from the current return signal sample. In block 612, this difference is then multiplied by a gain matrix to obtain an adjustment to the prior state estimate matrix. The gain matrix includes values that are re-calculated for each return signal sample. Although gain matrix values change from sample to sample, they do not depend on the actual return signal sample values.

The adjustment is then added to the range-Doppler state estimate matrix to obtain an updated range-Doppler state estimate matrix, in block 614. A different gain matrix is applied to for each return sample, with the gain matrix values computed by a process similar to the process described in FIG. 3. In block 616, the processes in blocks 608 to 614 are repeated for a next return signal sample received, using the updated state estimate matrix as the state estimate matrix for the next return signal sample, for a predetermined number of times. In some embodiments, the predetermined number of times for repeating process blocks 608 to 614 is a system parameter determined by considering the type and range of the radar, the environment in which the targets are going to be detected, the type of the targets, and the like.

In block 618, the magnitudes of the elements of the final state estimate matrix (which are the accumulation of the adjustments calculated in block 612) are used to compute an estimated range-Doppler map (RDM) by taking the magnitudes of the each of the complex valued elements of the final state estimate matrix. That is, each element of the RDM is the sum of the squares of the real and imaginary parts of the corresponding element of the final state estimate matrix.

These RDM values constitute estimates of the amplitudes of (presumed) targets with corresponding range and Doppler. Because of the corrupting effects of noise in the measurements and processing, these RDM estimates will contain random errors. If there is no target present with a range and Doppler corresponding to a particular RDM cell, there will be zero target amplitude and the value of that cell will be entirely due to noise. If a target is in fact present, the RDM cell value will be increased by the target amplitude. Consequently, the presence of targets is indicated by relatively large values (that is, peaks) in those RDM cells corresponding to the range and Doppler of the targets.

In some embodiments, a thresholding process may be applied to the estimated RDM to detect individual targets and obtain their range and Doppler parameters. That is, that value of each cell in the RDM is compared to a pre-set threshold value. If a cell's value exceeds the threshold, the detection of a target (with range and Doppler corresponding to the range/Doppler values associated with the RDM cell) is deemed to have occurred. This way, the disclosed invention improves the range-Doppler reflection coefficients estimates by adjusting certain parameters that affect the gain matrix computation and repeating these steps using the new series of gain matrices that result from the adjusted parameters. The threshold may depend on the environment in which the targets are going to be detected, the type of the targets, and the like.

Counting the number of cells in which a detection occurs indicates the number of targets present, and the range and Doppler parameters corresponding to detection cells indicate the range and range rate for each target. Together with knowledge of the radar beam direction, this information allows target locations to be estimated and tracked. The location information of the target can then be used for navigation, target locking, directing a camera or a weapon towards the target, and/or recognizing the target, among other known applications.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for estimating locations and range rates of a multiplicity of targets by estimating range-Doppler state representation, the method comprising:
   a. transmitting an arbitrary signal waveform by a transmitter;
   b. receiving a plurality of return signal samples reflected from the targets, by a receiver;
   c. computing and initializing a prior range-Doppler state estimate matrix, wherein the range-Doppler state estimate matrix is a two-dimensional matrix with a first index corresponding to a range and a second index corresponding to Doppler frequency of each potentially detected target;
   d. computing a measurement matrix containing phase shifted and re-ordered samples of the transmitted signal waveform; wherein computing the measurement matrix depends only on the transmitted signal and is independent of the return signal samples.
   e. applying the measurement matrix to the prior range-Doppler state estimate matrix to generate a prediction of a current return sample, and calculating a difference between the current return signal sample and the prediction of the current return signal sample;
   f. multiplying the difference by a gain matrix to obtain an adjustment to the prior state estimate matrix, wherein the gain matrix includes values that are re-calculated for each return signal sample;
   g. adding the adjustment to the prior range-Doppler state estimate matrix to obtain an updated range-Doppler state estimate matrix;
   h. repeating steps d to g for a next return signal sample using the updated state estimate matrix as the prior state estimate matrix for said next return signal sample, for a predetermined number of times to generate a final state estimate matrix;
   i. taking magnitudes of the elements of the final state estimate matrix to compute an estimated range-Doppler map (RDM);
   j. applying a threshold to the estimated RDM to detect individual targets and obtain their range and Doppler parameters; and
   k. using the range and Doppler parameters to estimate the locations and range rates of the targets.

2. The method of claim 1, wherein computing the estimated RDM further comprises taking the magnitudes of each of complex valued elements of the final state estimate matrix.

3. The method of claim 1, wherein each element of the RDM is the sum of the squares of the real and imaginary parts of the corresponding element of the final state estimate matrix and represents estimates of the amplitudes of the multiplicity of targets with corresponding range and Doppler.

4. The method of claim 3, wherein a presence of a target is indicated by values in RDM elements corresponding to the range and Doppler of the targets that are larger than a predetermined threshold.

5. The method of claim 1, wherein the estimated locations and range rates of the targets is utilized for one or more of navigating around or to the targets, monitoring speed of the targets, tracking one or more of the targets, forecasting the weather, locking a radar to one or more of the targets, directing a camera or a weapon towards one or more of the targets, and recognizing one or more of the targets.

6. The method of claim 1, wherein gain matrix values are independent of the return signal sample values.

7. The method of claim 1, further comprising displaying the estimated RDM on a display screen as an image, with brightness or color contrasts corresponding to the amplitude of each range-Doppler value.

8. A radar system for estimating locations and range rates of a multiplicity of targets by estimating range-Doppler state representation comprising:
   a transmitter for transmitting an arbitrary signal waveform;

a receiver for receiving a plurality of return signal samples reflected from the targets; and a processor including a memory for
  a. computing and initializing a prior range-Doppler state estimate matrix, wherein the range-Doppler state estimate matrix is a two-dimensional matrix with a first index corresponding to a range and a second index corresponding to Doppler frequency of each potentially detected target;
  b. computing a measurement matrix containing phase shifted and re-ordered samples of the transmitted signal waveform; wherein computing the measurement matrix depends only on the transmitted signal and is independent of the return signal samples.
  c. applying the measurement matrix to the prior range-Doppler state estimate matrix to generate a prediction of a current return sample, and calculating a difference between the current return signal sample and the prediction of the current return signal sample;
  e. multiplying the difference by a gain matrix to obtain an adjustment to the prior state estimate matrix, wherein the gain matrix includes values that are re-calculated for each return signal sample;
  f. adding the adjustment to the prior range-Doppler state estimate matrix to obtain an updated range-Doppler state estimate matrix;
  g. repeating processes b to f for a next return signal sample using the updated state estimate matrix as the prior state estimate matrix for said next return signal sample, for a predetermined number of times to generate a final state estimate matrix;
  h. taking magnitudes of the elements of the final state estimate matrix to compute an estimated range-Doppler map (RDM);
  i. applying a threshold to the estimated RDM to detect individual targets and obtain their range and Doppler parameters; and
  j. using the range and Doppler parameters to estimate locations and range rates of the targets.

9. The radar system of claim 8, wherein the processor takes the magnitudes of each of complex valued elements of the final state estimate matrix to compute the estimated RDM.

10. The radar system of claim 8, wherein each element of the RDM is the sum of the squares of the real and imaginary parts of the corresponding element of the final state estimate matrix and represents estimates of the amplitudes of the multiplicity of targets with corresponding range and Doppler.

11. The radar system of claim 10, wherein a presence of a target is indicated by values in RDM elements corresponding to the range and Doppler of the targets that are larger than a predetermined threshold.

12. The radar system of claim 8, wherein the estimated locations and range rates of the targets is utilized for one or more of navigating around or to the targets, monitoring speed of the targets, tracking one or more of the targets, forecasting the weather, locking a radar to one or more of the targets, directing a camera or a weapon towards one or more of the targets, and recognizing one or more of the targets.

13. The radar system of claim 8, wherein gain matrix values are independent of the return signal sample values.

14. The radar system of claim 8, further comprising a display screen for displaying the estimated RDM as an image, with brightness or color contrasts corresponding to the amplitude of each range-Doppler value.

* * * * *